V. WALSH.
AUTOMOBILE SIGNAL.
APPLICATION FILED OCT. 5, 1915.

1,227,226.

Patented May 22, 1917.
2 SHEETS—SHEET 1.

Vincent Walsh Inventor
By his Attorney

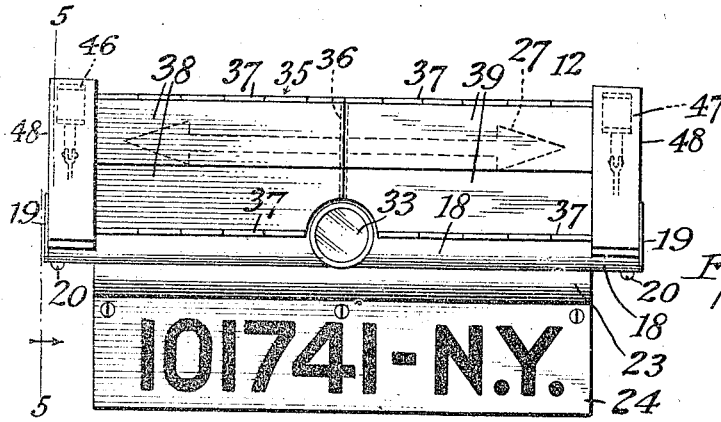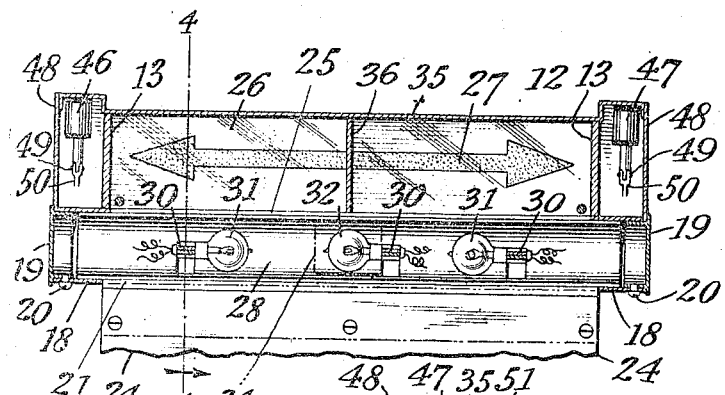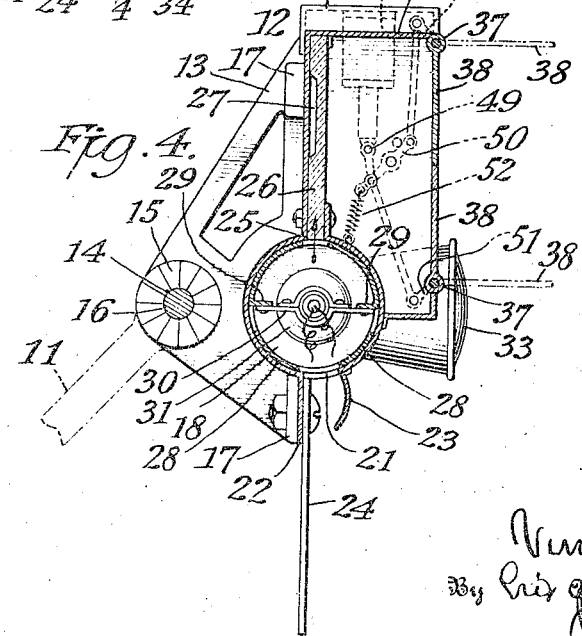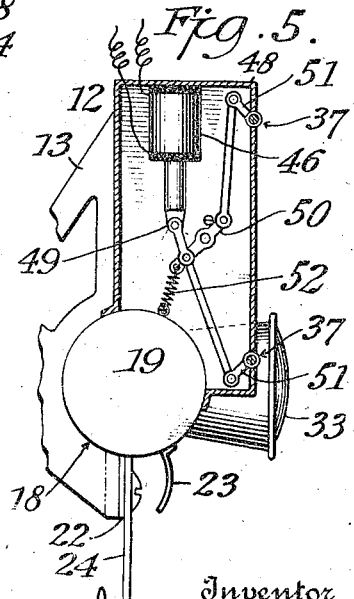

UNITED STATES PATENT OFFICE.

VINCENT WALSH, OF NEW YORK, N. Y.

AUTOMOBILE-SIGNAL.

1,227,226. Specification of Letters Patent. Patented May 22, 1917.

Application filed October 5, 1915. Serial No. 54,153.

*To all whom it may concern:*

Be it known that I, VINCENT WALSH, a citizen of the United States, residing in the borough of Manhattan, city, county, and State of New York, have invented a certain new and useful Improvement in Automobile-Signals, of which the following is a specification, reference being had to the accompanying drawings, which form a part of the same.

This invention relates to signals for use in connection with automobiles and other vehicles, a principal object being to provide a device of this class which is adapted to be carried on suitable supports at the rear of an automobile and which is controlled by, preferably, electrical means from the steering wheel, to transmit or display signals for the purpose of advising the driver of a car behind of an intended deviation from a straight course, and the invention further provides means for signaling a straight-ahead course.

A further object of my present invention is to provide automatic means for controlling the signals, and further means, hand operated, for accomplishing the same result.

A still further object being to provide means for adjusting the line of projection of the signal light rays downwardly or upwardly if desired.

In the drawings forming a part of this specification, similar reference characters are employed to indicate corresponding parts throughout the several views, and in which—

Fig. 2 is an enlarged rear elevation of the signal;

Fig. 3 is a vertical section on the same scale as Fig. 2, the line of section being indicated at 3—3 of Fig. 1;

Fig. 4 is a cross section on the line 4—4 of Fig. 3 on a still larger scale;

Fig. 5 is a sectional end elevation on the line 5—5 of Fig. 2; and

Figure 1:
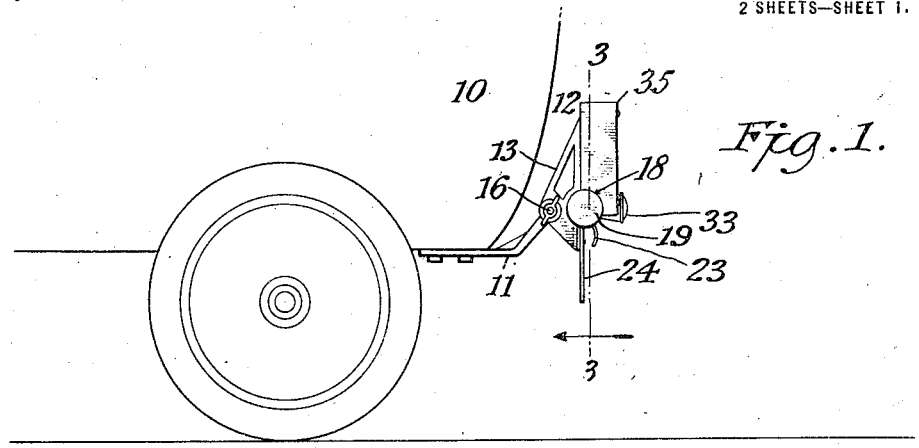
Figure 1 is a side elevation of my improved signal secured to the rear of an automobile, in operative position.

In the drawings I have shown at 10 a portion of an automobile having secured thereto a pair of brackets, or arms 11 (but one of which is shown) adapted to adjustably support my improved signal 12, comprising end frames or castings 13, of triangular formation, each of which is provided with an aperture 14, around which is radially formed a series of teeth 15, adapted to engage similar teeth (not shown) on the rear or free ends of the brackets 11, said teeth being locked in positive engagement by suitable bolts 16, having wing-nuts threaded thereon.

Each of the frames 13 is further provided with lugs or flanges 17, to which is suitably secured a cylindrical lamp house 18, having open ends, closed by suitable caps 19, which are retained in position by screws or pins 20.

The lamp house is slotted at the bottom as at 21, and is provided with a downwardly directed flange 22, and a curved reflector plate 23, the flange 22 being secured to the frame 13, as shown, while the reflector plate serves to deflect the light rays on to a license plate 24, also carried on the frame.

The lamp house is also formed at the top with a seat 25, over which is suitably secured a glass panel 26, in the front face of which is sand-blasted or otherwise formed the representation or figure of a double arrow as at 27, which operation provides a rough prismatic surface, and when in the operation of the signal, light rays are projected upwardly through the slot 26, in the plane of the panel and through the same, myriads of prismatic effects are obtained on the sand-blasted surface which produce an intense white simulating incandescence and can be seen at a great distance.

The lamp house receives a lamp frame constituted by a pair of semi-cylindrical plates 28, provided with integral lugs 29, to which are fastened suitable supports 30, for lamps shown at 31 and 32. The end lamps 31, are arranged to project light into the glass panel and either or both may be operated from the steering wheel, but the lamp 32, at night, is constantly energized to provide a tail light in co-action with a lens 33, the rear plate of the lamp frame being cut away at 34, to provide a light passage.

A hood 35, is suitably secured to the frame 13, and incloses the glass panel 26, said hood being divided centrally by a vertical partition 36; and hinged to the hood as at 37, are two pairs of shutters 38 and 39, each pair being separately controlled by automatic means at the steering wheel 40, of the automobile, said means comprising contact plates 41 and 42 and a contact finger 44 carried by the steering wheel stem 45, all being in electrical connection with solenoids 46 and 47, placed in suitable housings 48, at the ends of the signal structure. The solenoid cores are each connected as at 49, with an oscillatory lever 50, having its opposite ends linked to rock-arms 51, fixed to the ends of the pintle pins of the hinged shutters 38 and 39, which are fast therewith so that when the solenoid at one end of the signal structure is energized, the shutters at that end are swung outwardly through an arc of 90° as indicated by dotted lines in Fig. 4 of the drawings, thus exposing the glass panel at that end and simultaneous with this operation the corresponding lamp 31 is energized to illuminate the half of the arrow over the said lamp which in this instance points to the right, and thus the information is transmitted by this light signal to the driver of a car behind that the driver of the leading car intends to turn to the right, and if a course to the left is to be taken, the solenoid and lamp at the opposite end of the signal structure are energized automatically by the turning of the steering wheel to the left as will be readily understood.

Retractile springs 52, are employed to turn the shutter operating mechanism to its normal position when the operating circuits are broken.

I also provide hand operated means for controlling the signals, which consists of a switch arm 53 having a cross pin 54 and the switch arm may be thrown laterally to engage either of two terminal posts 55 and 56 or the cross pin 54 may be caused to engage both posts which would energize both solenoids and both lamps 31, to illuminate the complete arrow thus flashing a straight-ahead signal to the car behind.

Figure 6:
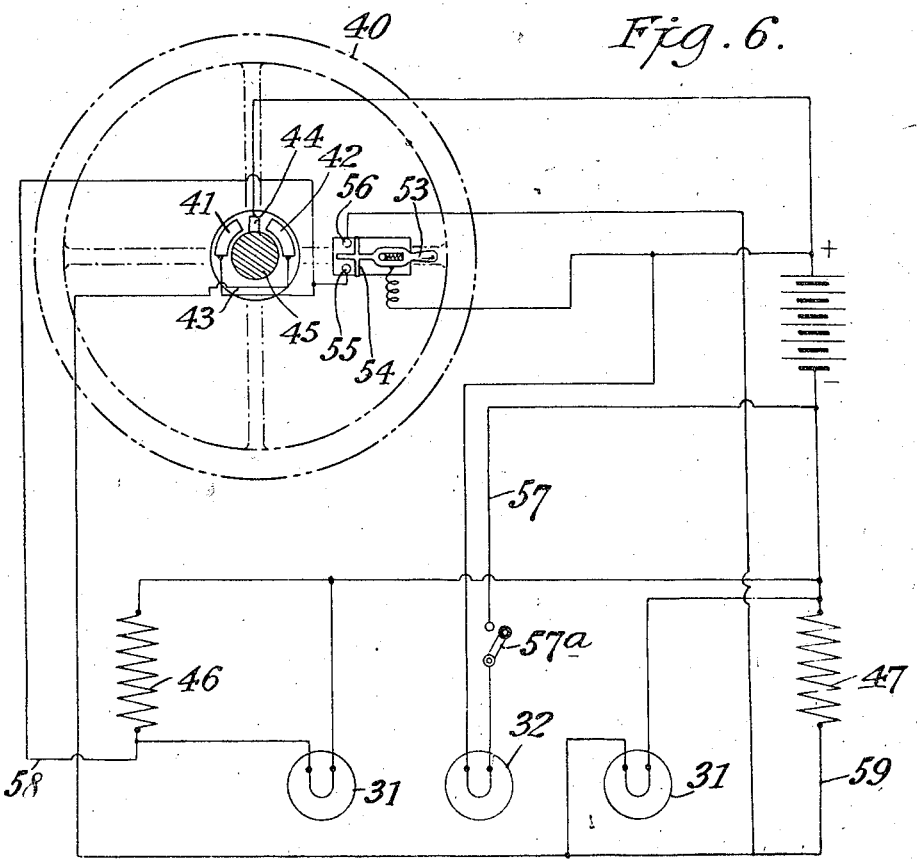
Fig. 6 is a diagram showing the circuits and the means for controlling the same.

Referring to Fig. 6 of the drawings it will be seen that the lamp 32 is in a local circuit 57, controlled by a switch 57ª, the lamp 31, at the left, is in the circuit 58, controlling the solenoid 46, while the lamp 31, at the right is in the circuit 59, controlling the solenoid 47, so by turning the steering wheel to the right or left the signal is automatically operated as will be readily understood.

While it is usual to place signals in the rear of an automobile it will readily be understood that the signal described herein may be placed either at the rear or at both rear and front. In the event of these signals being placed at both rear and front the wiring will be in multiple as is readily understood by persons skilled in the electrical art.

The terms and expressions employed are used as terms of description and not of limitation, and I have no intention, in the use of such terms and expressions, of excluding any mechanical or electrical equivalents of the features shown and described, or portions thereof, but recognize that various structural modifications are possible within the scope of the invention claimed.

Having thus described my invention what I claim and desire to secure by Letters Patent is set forth in the appended claims.

1. A signal for automobiles and the like, comprising a lamp house and a hood, provided with swinging shutters arranged in vertical pairs, electrical means for opening one pair of shutters or both simultaneously to display a signal and mechanical means for closing the same as described.

2. In a signal for automobiles and the like, a lamp house, having a glass panel mounted thereon, a divided hood, inclosing said panel, and provided with hinged shutters arranged in vertical pairs, electrical means to open the shutters to display a signal and mechanical means for closing the same as shown and described.

3. In a signal for automobiles a frame, a lamp house, secured thereto, and having longitudinal slots at the top and bottom thereof for the passage of light, a glass panel, mounted over the top slot, a divided hood, inclosing the panel, and provided with hinged shutters arranged in pairs, means for opening the shutters and for illuminating the panel to display a signal.

4. In a signal for automobiles, a lamp house, having a plurality of lamps therein, and being slotted at the top and bottom for the passage of light, a license plate arranged at one side of the bottom slot, and a curved reflector plate at the other, a glass panel arranged to register with the top slot and having a double arrow figure formed therein to provide a prismatic surface, a hood, inclosing the panel and provided with hinged shutters and means for opening the shutters and for simultaneously illuminating the panel to display a signal.

VINCENT WALSH.

Witnesses:
JAMES N. CATLOW,
EVA G. INCHRINGER.